Oct. 19, 1948.   R. VAN TRINE   2,451,700
COMPANION CLUTCH AND BRAKE PEDAL
FOR AUTOMOBILES AND THE LIKE
Filed Feb. 26, 1946   2 Sheets-Sheet 1
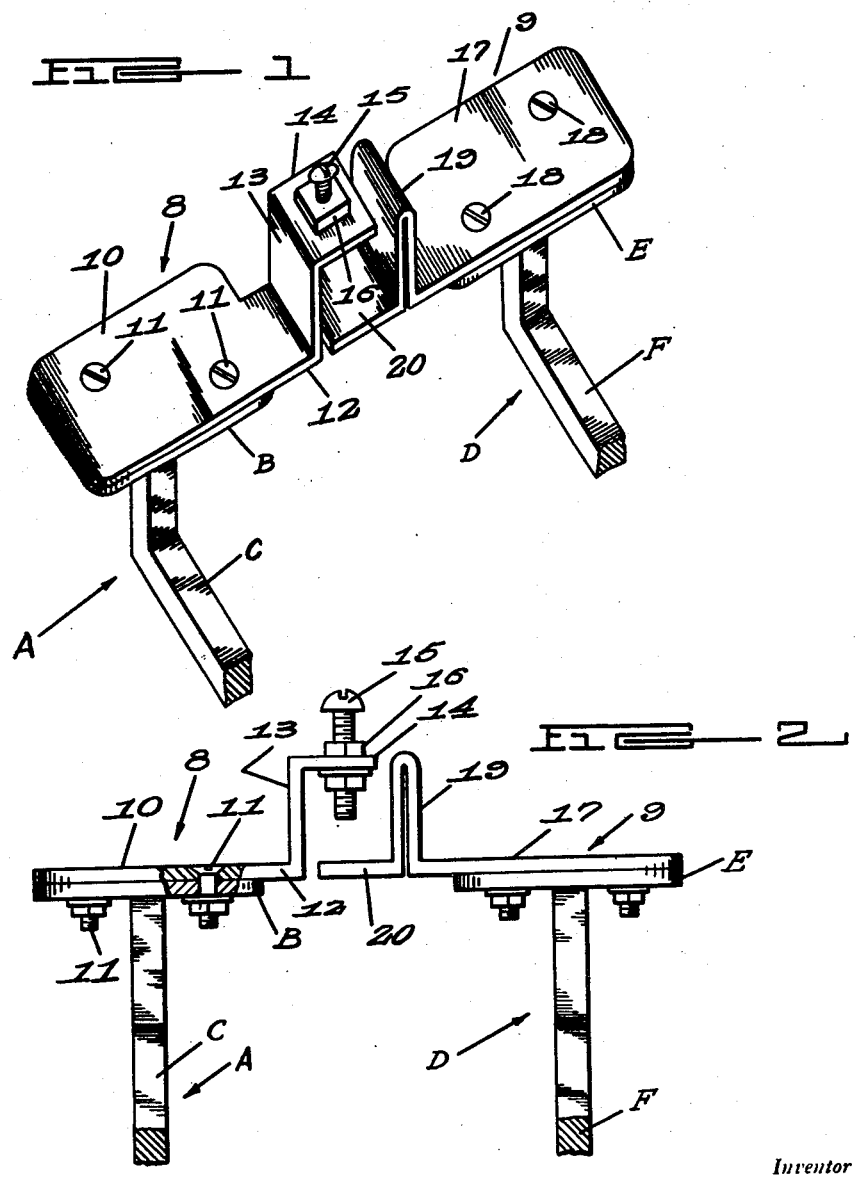
Inventor
RALPH VAN TRINE
By Clarence A. O'Brien
and Harvey B. Jacobson
Attorneys

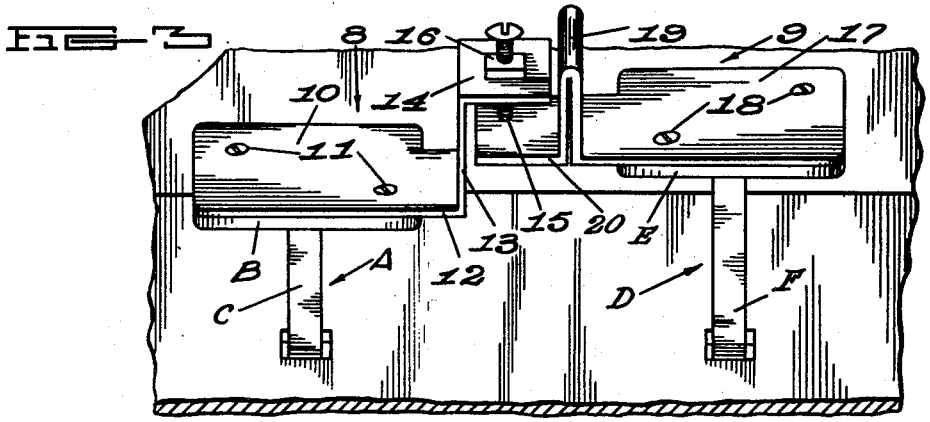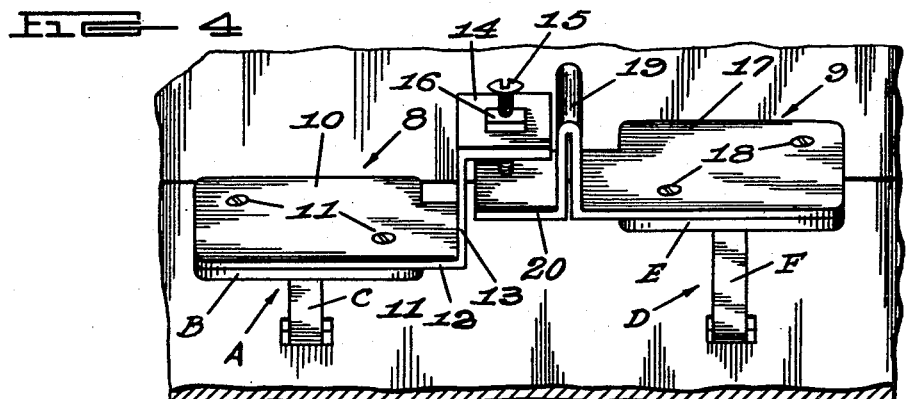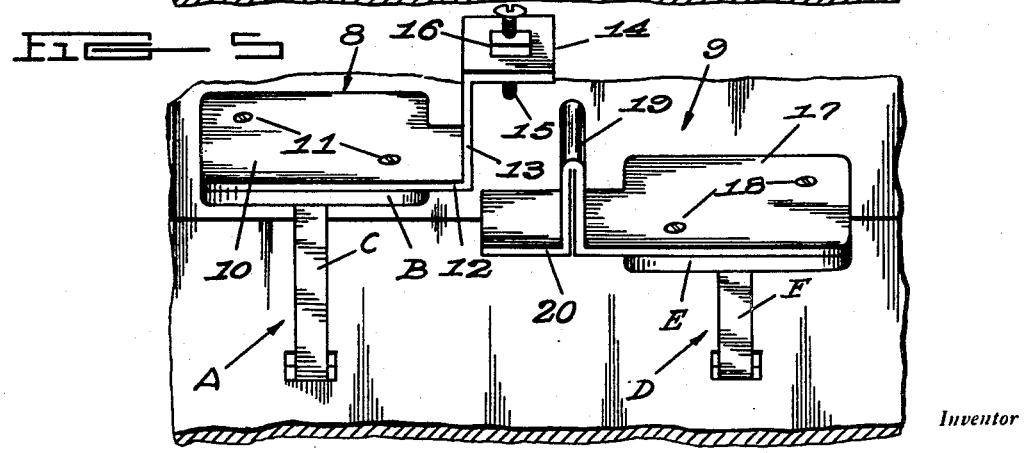

Patented Oct. 19, 1948

2,451,700

UNITED STATES PATENT OFFICE 2,451,700

COMPANION CLUTCH AND BRAKE PEDAL FOR AUTOMOBILES AND THE LIKE

Ralph Van Trine, Durham, N. C., assignor of thirty per cent to Leona T. Van Trine and thirty per cent to Marian Van Trine Davis, Durham, N. C.

Application February 26, 1946, Serial No. 650,268

2 Claims. (Cl. 74—478)

The present invention relates to structurally novel improvements in automobile clutch and brake pedals and has more particular reference to ways and means whereby said pedals may be actuated and controlled singly and conjointly.

The principal purpose of the invention is to provide a more satisfactory structural arrangement for appropriately and safely actuating and controlling the operation of the clutch, brake and foot throttle.

Another object of the invention is to so combine the clutch and brake into one operating unit so as to afford the user the choice of either action to the left leg to achieve motion, idling and brakeage, thus leaving the right leg for control of the throttle, this for acceleration, power and speed, resulting in what may be described as proper two-leg operation such as is calculated to promote confidence, complete control and maximum safety of operation. At many times during the driving of an automobile, keeping in mind the present arrangement of facilities necessary to be operated in connection with running the car by means of both legs, conditions arise where the car cannot be kept under safe and complete control as is pointed out in a few examples as follows:

First: An automobile coming up a grade stops at an intersection. In this case it is necessary to disengage the motor and apply the footbrake, thus tying up both left and right legs to hold the car stationary. When the car is able to proceed, if the right leg is removed from the brake to increase the acceleration of the car in order to pull up over the grade, then the car slides backward before such action may be completed with the possible result of bumping into a car to the rear, or in most cases of stalling the motor and the driver reaching for the emergency hand brake and then from that point on trying to start the car, keep it first out, then in gear, apply brakeage and drive it, is a very confused operation.

Second: A similar situation occurs when a car approaches downgrade to a street intersection and stops. Then, the driver is required to disengage the motor with his left foot, brake with the right foot and when ready to proceed, if he released the clutch with his left foot, at the same time trying to hold the brake in synchronism before proceeding and then rushing the right foot from the brake over to the throttle to keep the motor going. The usual result is a stalled motor and a car which is out into the intersection and out of the control of the driver before he realizes it.

It should be pointed out that, in the circumstances recited in the above, gears may be shifted when the clutch-brake pedal is in either the idling or the braking position.

Third: A car is being driven on ordinary roads or streets meeting and passing other automobiles, and in lines of traffic is required to be in various conditions of acceleration, brakeage, etc. The flexibility of this two leg operation will permit drivers to retain their car under control without the present tendency to drag the clutch, leaving the motor partly engaged and at the same time apply brakeage with the right foot while the speed of the motor of the car is kept at a high point so no stalling will occur. Automobile people have warned drivers about this practice of dragging the clutch and at the same time applying brakeage during the time when the driver has speeded up his motor in order to prevent the stalling of the motor.

Fourth: Suddenly in the path of an automobile a boy on a bicycle darts in front of the car, or a child runs out from behind a parked car. Immediately the left foot if free to apply brakeage or if acceleration is necessary the right foot is in position to apply power, thus giving the driver the opportunity to avoid causing personal injury or even death to other persons.

The above examples are only a few of the many defects of the present method of leg operation of automobiles.

With the foregoing in mind, I have evolved and produced simple mechanical devices, preferably in the nature of attachments, these being applicable to the existing or stock clutch and brake pedals and being of such construction and co-action as to permit satisfactory left-foot operation of combined clutch and brake facilities.

Other objects, features and advantages become more readily apparent from the following description and the accompanying illustrative drawings.

In the drawings, wherein like numerals are employed to designate like elements and parts throughout the same:

Figure 1 is a perspective view showing brake and clutch pedals provided with the improved attachments, the latter serving to achieve aforementioned ends.

Figure 2 is an edge elevational view, with a portion broken away and shown in section, this to bring out the construction and co-action of the attachments individually and collectively.

Figure 3 is a perspective view showing the clutch pedal depressed for shifting gears when accelerating the car.

Figure 4 is a view like Figure 3 but showing the attachments operating in unison, the clutch being disengaged and the brake applied.

Figure 5 is still another perspective view showing the clutch in normal engaged position and the brake independently applied.

Referring now to the drawings by distinguishing reference characters it will be observed that A denotes a conventional foot-controlled clutch including the foot-piece or pedal B carried by customary shank or lever C. The foot-brake is denoted at D and includes a pedal E on shank or lever F.

The clutch pedal attachment is denoted, as a unit, by the numeral 8 and the brake pedal attachment is denoted as a unit by the numeral 9. The attachment 8 comprises a plate 10 corresponding to and secured by fasteners 11 on the clutch pedal B. At the right hand or inner end is a narrow extension 12 carrying an L-shaped adapter and actuator, the latter including an upstanding vertical portion 13 and a horizontal trip portion 14. The vertical portion 13 constitutes a foot flange or stop which prevents endwise slippage of the left foot in an accidental direction from left to right. The horizontal portion 14, which is in effect a brake depressor, is provided with an adjustable stop-screw 15 and lock nut 16.

The brake pedal attachment comprises a substantially rectangular plate 17 corresponding to and secured by screws or similar fastenings 18 to the pedal E and the inner or left hand end of the plate is bent up and then down and upon itself, as at 19, to provide a safety stop flange for the right foot. The terminal end of the plate is bent laterally and horizontally, as at 20, and underlies the depressor 14 in spaced parallelism. Portion 20 constitutes an end thrust abutment and is engaged by the adjacent end of the actuating screw 15. It follows that both plates 8 and 9 are provided at their corresponding inner ends with upstanding safety flanges 13 and 19 and also with overlapping spaced co-acting elements 14 and 20 and an adjusting screw 15, these orderly arranged for proper progressive co-action.

Prior to mounting the attachments 8 and 9, the clutch should be carefully adjusted to disengage the motor by depressing the clutch pedal approximately two-fifths of the distance between its "normal" position and the floor board. The brake should be adjusted to start braking power when the brake pedal is depressed approximately one-fifth the distance between its normal position and the floor board and to complete full braking before the clutch pedal reaches the floor board.

In reference to use and operation, it is evident from Figure 3 how the left foot may be utilized to actuate and control both clutch and brake pedals simultaneously. This figure shows the clutch pedal depressed approximately ½, this in position for shifting gears when accelerating the car. At this time, the left foot is on the attachment 8 and said attachment is forced down until the tip of the set-screw 15 engages the motion pick-up and thrust member 20 of the attachment 9. Then, as shown in Figure 4, by forcing the clutch further in, the desired thrust action is imparted against the element or member 20 and the attachment 9 is brought into play and the brake pedal is depressed for purposes of applying the brake, in an obvious manner. Also, at this stage the right foot is free for operating the usual accelerator. Then, as brought out in Figure 5, the right foot can be placed on the attachment, that is the brake attachment 9, and the latter can be forced down to operate the brake or to retard the motion of the car whenever necessary or desired. It is also possible to apply both feet to both attachments 8 and 9, simultaneously, in braking the car in certain emergencies.

As pointed out in the introductory portion of the description, I have in mind a structure which lends itself readily adaptable to two-leg operation, this with confidence, complete control and maximum safety of operation. Here is the manner in which this so-called two-leg phase of the invention can best be grasped and understood, to wit:

*Left leg operation.*—The present type clutch pedal or any future modification or development of an automobile clutch may be arranged to operate through three periods. The first period of operation will disengage the motive power, the second period will provide an idling and gear shifting possibility, and the third period will control the braking facilities and also permit gear shifting. Relating this operation to the present type of automobile clutch pedal, the left foot would operate the clutch as at present and the idling and gear shifting space would be encountered on pressing the pedal downward; the center of the idling space being indicated by a slight click or sound audible to the ear and lightly felt by the foot. A further pressure of this pedal would operate the braking facilities.

*Right leg operation.*—The right foot, being relieved of the usual braking requirements, would be available for uninterrupted control of the throttle pedal. A foot brake pedal, as presently used, may remain on the car and will be used very infrequently such as when going down steep grades in gear and a slight brake is required in addition to the motor retardation of the car. The right foot would as at present in some automobiles still be used for starting the motor.

In view of the foregoing description taken in conjunction with the accompanying drawings it is believed that a clear understandng of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes, such as, among other things, affixing the devices to the shank or lever of the clutch and brake mechanism so as to combine the clutch and brake into one operating unit as to afford the user the choice of either action to the left leg to achieve motion, idling and brakeage, thus leaving the right leg for control of the throttle, for acceleration, power and speed, resulting in what may be described as proper two-leg operation, these arrangements being fully comprehended by the spirit of the invention as herein described and the scope of the appended claims.

What I claim is:

1. In combination, a clutch operating pedal, a brake operating pedal, an upstanding flange carried by the clutch operating pedal constituting a safety stop and to prevent accidental slippage of the left foot, and an upstanding safety stop flange carried by the brake pedal and located to prevent accidental slippage of the right foot, said flanges being disposed on adjacent marginal ends of the respective clutch and brake pedals, said first flange being provided with a horizontal actuating member, and said second flange being likewise provided with a horizontal thrust member, said members being disposed in superposed normally spaced parallelism.

2. In combination, a clutch operating pedal, a brake operating pedal, an upstanding flange carried by the clutch operating pedal constituting a safety stop and to prevent accidental slippage of the left foot, and an upstanding safety stop flange carried by the brake pedal and located to prevent accidental slippage of the right foot, said flanges being disposed on adjacent marginal edge portions of the respective clutch and brake pedals, said first flange being provided with a horizontal actuating member, and said second flange being likewise provided with a horizontal thrust member, said members being disposed in normally spaced parallelism, and the first member being provided with an adjustable pressure applying screw engageable with the second named member.

RALPH VAN TRINE.

REFERENCES CITED

The following references are of record in the file of this patent:

UNITED STATES PATENTS

| Number | Name | Date |
|---|---|---|
| 1,137,166 | Pierce | Apr. 27, 1915 |
| 1,820,359 | Manning | Aug. 25, 1931 |
| 1,979,029 | Fetter | Oct. 30, 1934 |
| 2,167,959 | Pomernacki | Aug. 1, 1939 |
| 2,252,013 | Lenpold | Aug. 12, 1941 |